UNITED STATES PATENT OFFICE.

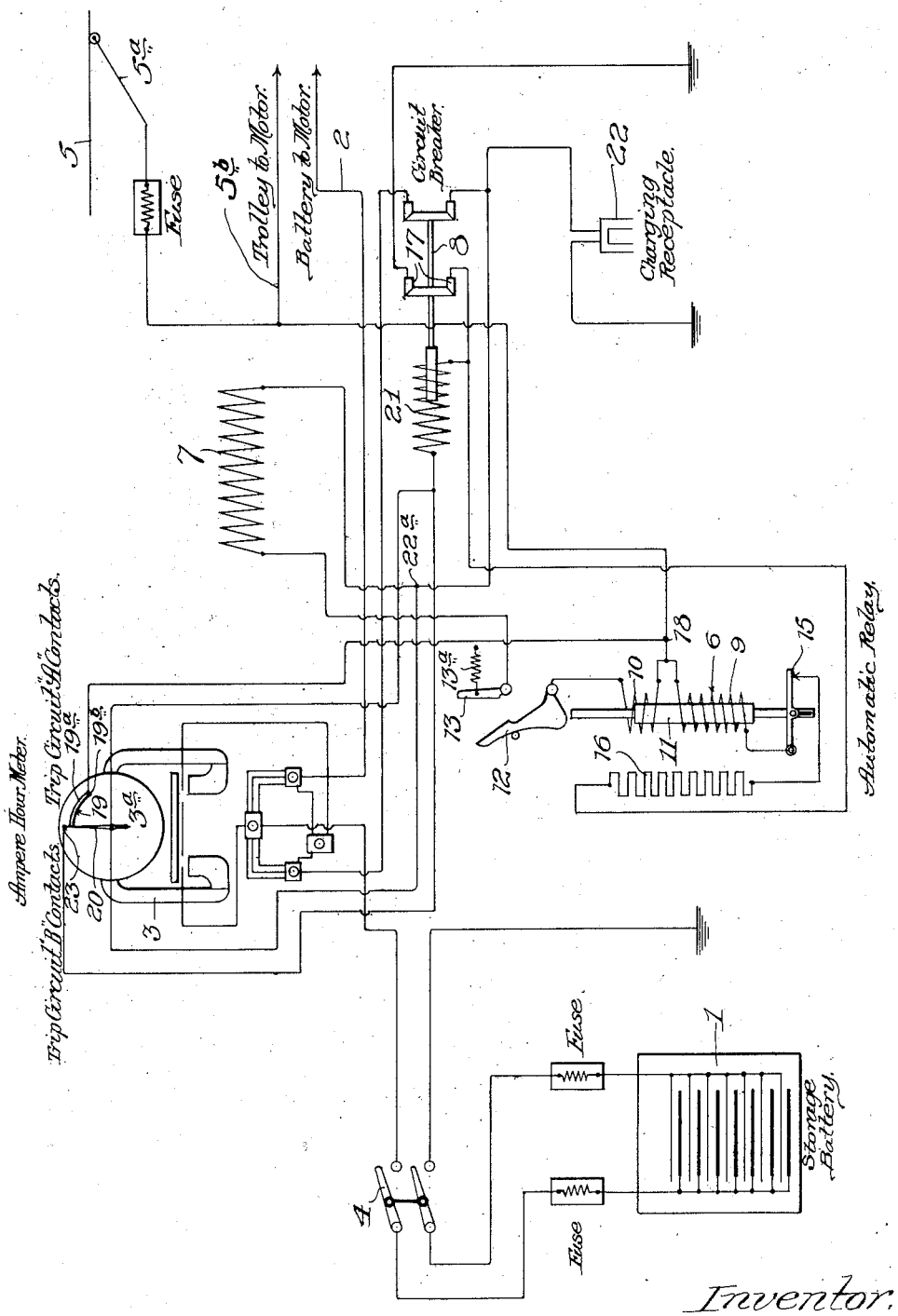

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS.

CHARGING SYSTEM FOR STORAGE BATTERIES.

1,360,592.  Specification of Letters Patent.  Patented Nov. 30, 1920.

Application filed February 20, 1920. Serial No. 360,038.

*To all whom it may concern:*

Be it known that I, WILLIAM W. SLOANE, a citizen of the United States, residing at Chicago, in the county of Cook and State of Illinois, have invented an Improvement in Charging Systems for Storage Batteries, of which the following is a specification.

This invention relates to improvements in charging systems for storage batteries, and more particularly to charging systems for storage battery locomotives provided with a trolley adapted to have connection with a feed wire during a portion of the time of operation of the locomotive.

The object of my invention, generally stated, is to provide an improved automatically controlled charging system for locomotives, in which the storage battery may be charged while the locomotive is being operated by current from a trolley wire over wired areas of the track, and may also be charged from a charging station during the periods that the locomotive is not in operation.

Storage battery locomotives have heretofore been provided with a trolley connection and suitable controller and motor equipment, so that the locomotive may be operated either from the trolley or the battery. It has further been proposed to use a portion of the current to charge the battery while the locomotive is being operated from the trolley, thus admitting the use of a smaller storage battery, and more continuous operation of the locomotive without recharging from a charging station.

In carrying out this proposal, however, allowance must be made for several practical considerations, among which may be mentiond; first, that of reducing and controlling the high voltage trolley current for charging purposes; second, that of controlling and adjusting the charging current depending upon the state of charge of the battery, especially in certain types with which it is desirable to "taper" the charge, that is to say, to constantly reduce the charging current as the battery approaches its fully charged condition; third, that of preventing a discharge of the battery back through the trolley circuit when, as frequently occurs in mining operations, the trolley voltage temporarily falls below that of the battery. Obviously, it is highly desirable to relieve the locomotive operator of attention to such details incident to the proper charging of the battery.

In the present invention, I provide an automatically operated charging control system to be carried on a locomotive, which system includes means for preventing a reversal of current in the trolley charging circuit, means for reducing a high-voltage trolley current to a degree suitable for charging, and means for restricting the charging current to times when such current does not exceed the proper charging rate, and in which further means are provided whereby the finishing charge may then be given from a charging station, where the current is more easily controlled, and the desired "tapering" charge may be properly given.

I am aware that charging systems have been heretofore provided with a trip circuit adapted to interrupt the charging circuit under predetermined conditions of the battery charge, but as will hereinafter appear, the present invention provides for charging from a plurality of charging sources, each having trip circuits adapted to be operated under different conditions of the battery, but arranged so that the charge may be taken from either of said sources without requiring any attention from the operator in changing from one source to the other.

For a fuller understanding of my invention, reference may be had to the drawing, in which the single figure illustrates diagrammatically the apparatus and the control circuits employed.

In the diagram, I have indicated a storage battery 1 adapted to be carried by the locomotive, and to provide power thereto while operating over unwired portions of the track. The controller and motor equipment of the locomotive may be of any approved design adapted to be driven either from the battery, or from an external power supply line. The details of the controller and motor equipment are omitted, as they form no part of the present invention. The arrangement is such that the current from the battery used in operating the locomotive passes through an ampere hour meter 3. and is registered therein on a dial 3ª which is calibrated to indicate at any given time the amount of discharge in ampere hours from the battery.

A double-pole switch 4 may be inserted in the battery connections to cut out the battery when desired.

A connection with the power supply line 5 for the purpose of operating the locomotive over wired portions of the track, may comprise a trolley 5ª, or similar traveling contact means, and a conductor 5ᵇ leading to the controller and motor, as shown.

The charging circuit connecting said trolley to the battery comprises an automatic relay 6, a resistance 7, circuit breaker 8, and the ampere hour meter 3. This charging circuit is also provided with a trip circuit to be hereinafter described, which I term circuit "A." It will be noted that the charging current passes through the ampere hour meter in a direction opposite to the discharging current from the battery. I find it preferable to arrange the meter so that it reads somewhat slower on the charge than on the discharge, in order to compensate for usual battery losses incurred. The reading of the meter thus indicates at any time the number of ampere hours discharged from the battery. The ampere hour meter may be of any suitable construction for the performance of its function.

The automatic relay 6 comprises a shunt-winding 9, series winding 10, and an endwise movable armature 11 adapted to have contact at its upper end with a swinging contact member 12. Said contact member is adapted to engage a contact finger 13, the latter preferably having a hinged mounting, and being provided with a spring 13ª, to have a yielding contact with said member 12. The shunt-winding 9 is connected to ground through an auxiliary switch 15, non-inductive resistance 16, and circuit breaker connections 17, 17, of the circuit breaker 8. The operation of the relay 6 is as follows: When the contact member 12 is in opened position as indicated in the diagram, and circuit breaker connections 17, 17 are closed, a current introduced from the trolley 5 will pass through the shunt-winding 9, switch 15, resistance 16 and circuit breaker connections 17, 17, to ground. The energizing of the shunt-coil 6, operates to move the armature 11 upwardly to push the member 12 into engagement with the finger 13. As this contact is made the current may then pass directly through the series winding 10, to assist the magnetism of the shunt winding 9 and complete the charging circuit to the battery. The automatic relay is so arranged that when the armature 11 reaches its topmost position, the switch 15 is opened and all of the charging current from the trolley then passes through the charging circuit. The purpose of including the circuit breaker connections in the shunt circuit will hereinafter appear, in the description of the operation of the complete apparatus.

When the voltage of the trolley line falls below that of the storage battery, or the trolley connection is entirely disconnected, the current through the series winding falls to zero, and the resulting failure of magnetism will allow the armature 11 to move downward by gravity. The member 12 then drops out of contact with the finger 13, partially from the operation of the spring 13ª, and partially from gravity.

While I have described a particular construction of an automatic relay, it will be understood that any equivalent device that operates to automatically open and close the circuit, depending upon the relative potentials on either side thereof, may be utilized for the function described.

The trip circuit "A" associated with the trolley charging circuit, comprises a conductor shunted from the trolley charging line at point 18, a contact device 19 controlled by a moving part on the ampere hour meter, a solenoid 21 for actuating the circuit breaker 8, and contacts 17, 17, of said circuit breaker. Said contact device may be of any suitable construction, as for instance, segmental contact member 19ª, and the meter indicator 20 adapted to contact therewith so as to close the circuit in all positions of the indicator between zero and a certain point 19ᵇ on the dial. This last named point I term the "critical point," which corresponds with the amount of discharge from the batteries beyond which the battery may be charged from the trolley. Conversely, and in the sense hereinafter used, it is the point at which trip circuit "A" is adapted to interrupt the charging current as the battery is being charged from the trolley.

The purpose of trip circuit "A" is explained as follows: It is well known to those skilled in the art, that storage batteries are subject to injury if charged continuously at an excessive rate. It is also well known that the ability of a lead storage battery to take up, or receive the charge, decreases as it approaches its fully charged condition; consequently, there is a certain inverse relation between the state of charge of the battery and the rate at which the current may be introduced without causing excessive heating or gassing of the electrolyte. A practical rule for continuous charging has been established by experiment and may be applied to all batteries of the lead plate type. This rule may be stated as follows: The rate of charge expressed in amperes, should not exceed the amount the battery lacks of being fully charged expressed in ampere hours. This rule, when strictly applied, gives what is commonly termed a "tapering" charge. In practice, it permits a comparatively wide variation in charging current when the battery is partially exhausted, and makes it necessary to carefully limit, or "taper," the current only during the "finishing" charge. It will now appear, that the function of trip circuit "A," is to interrupt the charging circuit whenever the battery has been recharged to a point when the current in the charging circuit may become excessive. The "finishing" charge, to complete the full charge of the battery, may then be given from a charging receptacle 22 connected to a charging station, as will hereinafter be described.

The method used in determining and limiting the amount of current in the trolley charging circuit is as follows: Obviously, the maximum current in the charging circuit depends primarily upon the maximum voltage available on the trolley line 5, and the resistance put in the charging circuit. Disregarding line losses, the last named resistance comprises the internal resistance in the battery, and the resistance 7. The battery resistance, although varying with the charge in the battery, may be determined for any given state of charge by experiment, or when possible, by reference to a previously prepared graph showing the resistance curve for the particular battery. Therefore, by adding sufficient resistance in rheostat 7 to the value of the internal resistance of the battery at the instant the indicator on the meter dial reaches the critical point, we may limit the charging current so as not to exceed the proper charging rate in amperes at the time the trip circuit "A" closes. Furthermore, in view of the rule hereinbefore mentioned, which states that the amount of charge expressed in amperes should not exceed the amount of discharge from the batteries expressed in amperes hours, it follows that the maximum current, in amperes, in the charging circuit may be approximately the same as the numerical value of the critical point, in ampere hours. In other words, the rule is complied with by choosing any condition in which the critical point is numerically the same as the maximum number of amperes which may pass through the charging circuit at that instant.

It must be observed in this connection, however, that the smaller the value of the critical point determined upon, the less amount of current will be available to build up the charge in the battery. Consequently, a critical point and corresponding charging resistance value must be chosen which will produce sufficient charging current for practical purposes, depending largely upon the amount and character of the service required of each locomotive. It is not usually desirable to give more than two full charges to a storage battery in twenty-four hours. Therefore, as an instance, if a locomotive is in operation eight of the twenty-four hours, the critical point and charging resistance should be adjusted so as to give the battery not to exceed one full charge during its average daily schedule of operation. If necessary, any abnormal discharges may then be replenished, and the finishing charge given to the battery, from a charging station while the locomotive is not in use, as for instance at night.

The charging receptacle connection 22 may comprise any suitable connecting device located on the locomotive and adapted to be attached to the source of supply at a charging station. The receptacle charging circuit comprises the circuit breaker 8, ampere hour meter 3, and also, a second shunt trip circuit, which I designate as trip circuit "B." This trip circuit comprises a shunt connection from the receptacle charging line, as for instance at point $22^a$. The trip circuit "B" is controlled by a contact device on the ampere hour meter 3 similar to that of trip circuit "A" before described, excepting that instead of a continuous segment adapted to be contacted by the indicator in several positions of the latter, trip circuit "B" is provided with a single contact-point 23, adapted to be contacted by the indicator 20 only at the zero-point on the dial, in which condition the battery is fully charged. The purpose of trip circuit "B" is to interrupt the circuit when the battery becomes fully charged from the charging station, thereby preventing accidental overcharging of the battery.

The operation of the charging system is as follows: If it is desired to operate the locomotive from the storage battery, the current is supplied to the motors through the ampere hour meter 3 and conductor 2, so that the amount of discharge, in ampere hours, is registered in the meter. In this condition, the automatic relay 6 is opened, and no other portions of the system are operative.

When the locomotive reaches a wired portion of the track, and the motor is arranged to be operated from the trolley current, the charging system is affected under various conditions of operation as follows: First, if the trolley connection should be made when the battery is not discharged beyond the critical point, the circuit "A" will be immediately energized, and circuit breaker 8 is opened to prevent any charging of the battery. Should the operator attempt to close the circuit breaker 8 at any time that the battery is not discharged beyond the critical point, the circuit breaker will immediately re-open automatically, so that no charge can be taken from the trolley until the battery becomes discharged to a point below the critical point. Second, if the battery is discharged beyond the critical point, and the potential of the trolley current exceeds that of the battery (which is the normal condition) the automatic relay 6 closes, and the charge may be given to the battery through resistance 7. Third, when the charge reaches the critical point, trip circuit "A" is energized to break the charging circuit. Fourth, if the trolley potential falls below the battery potential while charging, the relay 6 is automatically opened to prevent any discharge back into the power lines, and remains open until the trolley potential is restored. Fifth, if the trolley is disconnected from the trolley wire, relay 6 is automatically opened, thereby preventing a discharge from the trolley pole by accidental contact therewith. Sixth, when it is desired to charge the batteries from a charging station, the charging receptacle connection 22 is used. Such charging station may be provided with any means for controlling the charging current, as for instance, adjustable resistances, a motor-generator set, or a constant potential source so proportioned to the battery resistance as to automatically furnish the proper "tapering" charge. Any of such charging means, or variations thereof, may be applied, as desired. Seventh, when the "finishing" charge from the charging receptacle is completed, trip circuit "B" is actuated to prevent accidental overcharging the battery, regardless of the charging method adopted.

Referring now to more detailed features of my improved apparatus, it will be observed, that the charging receptacle circuit utilizes the same circuit breaker connections as the trolley charging circuit, as obviously, both charging sources are not intended to be used at the same time. Similarly, trip circuits "A" and "B" are both adapted to actuate said circuit breaker, but the arrangement is such that the trip circuits are controlled independently of each other, the circuit breaker being operated by the former trip circuit only when charging from the trolley and the meter reading is between zero and the critical point, the latter trip circuit operating only when charging from the receptacle and the meter reading is zero. This independent operation of the two trip circuits is accomplished by putting the trip circuit "A" across the relay 6, as indicated in the drawing by the connection 18, located between the relay 6, and trolley 5ᵃ. It has been pointed out, that the instant the trolley is disconnected from the supply wire 5, the relay 6 is automatically opened. Whenever relay 6 is thus opened, trip circuit "A" is rendered inoperative as far as the charging receptacle circuit is concerned, and the battery may then be charged from the receptacle beyond the critical point, until the full charge is received, and trip circuit "B" is actuated. However, if the trolley should be again connected either accidentally or purposely, at any time when the indicator is between zero and the critical point, trip circuit "A" is still operative, and will immediately actuate the circuit breaker to prevent an excessive charge from this source.

After the circuit breaker is opened by the closing of trip circuit "A" or "B," it will be seen that relay 6 also opens, due to the failure of current in series winding 10. Thereafter, so long as the circuit of shunt winding 9 of the relay remains broken at contacts 17, 17, of the circuit breaker, said relay cannot be energized to reclose the trolley charging circuit. The purpose of this arrangement is to eliminate "fluttering" of the relay contacts, that is to say, a repeated opening and closing of the relay, induced by the intermittent energization of the shunt winding 9 from the trolley. From the above description, obviously, variations in the circuit connections and location and arrangement of parts will occur to those skilled in the art, and the advantages and benefits thereof may be secured in locomotives or other vehicles embodying apparatus differing widely from that described and shown without departing from the spirit and scope of my invention. It therefore should be understood, that only such limitations should be imposed as are indicated in the appended claims.

Having described my invention what I claim as new and desire to cover by Letters Patent, is:

1. In an electric locomotive, in combination, a storage battery two, charging circuits, each adapted to be connected to a different source, a circuit breaker for both of said circuits, means continuously responsive to one state of charge of said battery for actuating said circuit breaker, and means for actuating said circuit breaker responsive to another state of charge of said battery when charging from one of said sources.

2. In an electric locomotive, in combination with two external sources, one of which is of relatively high voltage, of a storage battery carried by said locomotive adapted to be charged from either of said sources, a circuit breaker for interrupting the charging current from both of said sources, means continuously responsive to one state of charge of said battery for energizing said circuit breaker, means responsive to another state of charge of the battery for energizing the circuit breaker when charging from said high voltage source, and a voltage reducing means interposed between said high voltage source and said battery.

3. The combination with an electric locomotive, of a storage battery carried thereon, a charging circuit for said battery having two branches each adapted to be connected to an independent source of current supply, a circuit breaker controlling the flow of current through said charging circuit, means for automatically actuating said circuit-breaker at any time after a certain amount of charging current has been supplied to said battery, upon an attempt to further charge the same through one of said branches, and means for also automatically actuating said circuit breaker after a predetermined additional amount of current has been supplied to said battery through the other of said branches.

4. In an electrical locomotive, in combination, a storage battery, two charging circuits adapted to be connected to external sources, a magnetically actuated circuit breaker for interrupting both of said circuits, an automatic relay in one of said circuits permitting a flow of current in one direction only, two trip circuits for energizing said circuit breaker, one of said trip circuits being connected across said relay, and each of said trip circuits being independently responsive to a different predetermined state of charge of said battery.

5. In an electric locomotive, in combination with two external sources, one of which is of relatively high voltage, of a storage battery carried by said locomotive adapted to be charged from either of said sources, a single device for controlling the charging current from both of said sources, means continuously responsive to one state of charge of said battery for actuating said control mechanism, means responsive to another state of charge of the battery for actuating said control mechanism when charging from said high voltage source, and a voltage reducing means interposed between the battery and said high voltage source.

6. In an electric locomotive, in combination, two external sources, one of which is normally of relatively high voltage, of a storage battery carried by said locomotive, and adapted to be charged from either of said sources, voltage reducing means interposed between said high voltage source and said battery, means for preventing discharge into the source when the voltage thereof falls below that of the battery, a magnetically actuated circuit breaker adapted to interrupt the charging current from both of said sources, means continuously responsive to one state of charge of said battery for energizing said circuit breaker, and means responsive to another state of charge of the battery for energizing the circuit breaker when charging from said high voltage source.

WILLIAM W. SLOANE.